United States Patent [19]

Mizoguchi

[11] Patent Number: 5,008,852
[45] Date of Patent: Apr. 16, 1991

[54] PARALLEL ACCESSIBLE MEMORY DEVICE

[75] Inventor: Hiroshi Mizoguchi, Tokyo, Japan

[73] Assignee: Kabushiki Kaisha Toshiba, Kawasaki, Japan

[21] Appl. No.: 175,484

[22] Filed: Mar. 30, 1988

[30] Foreign Application Priority Data

Mar. 31, 1987 [JP] Japan .................. 62-076489

[51] Int. Cl.⁵ .............. G06F 12/00; G06F 12/06; G11C 8/00
[52] U.S. Cl. .................. 364/900; 364/957.1; 364/957.5; 364/966.3; 364/966.4; 365/230.03
[58] Field of Search .............. 365/230.03; 358/75, 358/903; 382/41; 364/518, 200 MS File, 900 MS File

[56] References Cited

U.S. PATENT DOCUMENTS

| 4,092,728 | 5/1978 | Baltzer | 364/900 |
|---|---|---|---|
| 4,449,199 | 5/1984 | Daigle | 364/900 |
| 4,570,236 | 2/1986 | Rebel et al. | 364/900 |
| 4,603,348 | 7/1986 | Yamada et al. | 358/75 |
| 4,667,308 | 5/1987 | Hayes et al. | 364/900 |
| 4,675,808 | 6/1987 | Grinn et al. | 364/200 |
| 4,740,923 | 4/1988 | Kaneko et al. | 365/230.03 |

FOREIGN PATENT DOCUMENTS 58-151683 9/1983 Japan .

Primary Examiner—Michael R. Fleming
Assistant Examiner—Gopal C. Ray
Attorney, Agent, or Firm—Foley & Lardner

[57] ABSTRACT

A parallel-accessible memory device of one or multiple dimensions has submemories for the respective dimensions. Each of the submemories has a capacity provided by dividing the total memory capacity by positive integers given for the respective dimensions. The memory device comprises an address converting section for generating addresses of the submemories of the respective dimensions according to dimensional addresses; a data rearranging section for rearranging input and output data of the submemories in a required order, the input and output data being specified by the submemory addresses from the address converting section; and a write controlling section for selectively renewing data in a region of the submemories of the respective dimensions.

8 Claims, 7 Drawing Sheets

FIG.5

| X | · · | 4K | 4K+1 | 4K+2 | 4K+3 | · · | · · · |

| d0 | d1 | d2 | d3 |

| d1 | d2 | d3 | d0 |

| d2 | d3 | d0 | d1 |

| d3 | d0 | d1 | d2 |

FIG.6

| X | 0 | 1 | 2 | 3 | · · · · | 4K | 4K+1 | 4K+2 | 4K+3 | · · · · · |
|---|---|---|---|---|---|---|---|---|---|---|
| X0 | 0 | 1 | 1 | 1 | · · · | K | K+1 | K+1 | K+1 | · · · |
| X1 | 0 | 0 | 1 | 1 | · · · | K | K | K+1 | K+1 | · · · |
| X2 | 0 | 0 | 0 | 1 | · · · | K | K | K | K+1 | · · · |
| X3 | 0 | 0 | 0 | 0 | · · · | K | K | K | K | · · · |

PARALLEL ACCESSIBLE MEMORY DEVICE

BACKGROUND OF THE INVENTION

1. Field of the Invention

The present invention relates to a memory device which is accessible in parallel at a high speed by a single accessing operation.

2. Description of the Prior Art

Neighborhood operations and line tracing processes such as a spatial filtering in image processing frequently refer to peripheral pixels surrounding a pixel in question among image data stored in two-dimensional image memories. In this case, an eight-neighborhood operation with respect to the pixel in question is generally used.

When such an operation is carried out for "$n_1 \times n_2$" pixels by using a two-dimensional memory where only one pixel is accessible by a single memory accessing operation, the accessing operation is repeated "$n_1 \times n_2$" times for processing the "$n_1 \times n_2$" pixels, increasing the processing time.

To cope with this problem, there has been proposed a method using a high-speed memory device that has a quicker accessing speed than the processor. Within one memory accessing interval of the processor, the high-speed memory device accesses "$n_1 \times n_2$" pixels in time-dividing manner.

This high-speed memory device is, however, expensive and requires a controlling mechanism to be provided therewith for the time-sharing accessing, thereby increasing the cost and complicating the device.

There has been proposed another method to cope with the problem. This method uses, instead of the high-speed memory device, two-dimensional memories each having a normal accessing speed, the number of memories being "$n_1 \times n_2$" which corresponds to the total number of pixels. The respective two-dimensional memories store the pixels shifted one by one. Addresses respectively shifted one by one are simultaneously supplied to the respective two-dimensional memories such that the "$n_1 \times n_2$" pixels are simultaneously read by a single accessing operation.

However, this method requires the two-dimensional memories of the number of "$n_1 \times n_2$" so that the size of the memory device is large, increasing the cost. In addition, it is necessary in a writing operation to renew the same pixels of all of the "$n_1 \times n_2$" memories so that the respective two-dimensional memories should be supplied with the same addresses in the reading and writing operations. For this, an address switching mechanism should be added to the memory device, complicating the device. Although the reading operation may quickly be carried out, the writing operation will be slowed because the same data should be supplied to "$n_1 \times n_2$" data lines by a special mechanism and because every memory access can write only one pixel.

As mentioned in the above, for simultaneously processing a region of "$n_1 \times n_2 \times \ldots \times n_k$" by a single memory accessing of the multidimensional (two-dimensional or more) memories, the prior art using the high-speed memory device in the time-sharing manner is expensive and requires the time-sharing control mechanism, complicating the device. The prior art using the normal accessing speed memory devices of the number of "$n_1 \times n_2 \times \ldots \times n_k$" to constitute "k"-dimensional memories enlarges the size of the device and requires the address switching mechanism for reading and writing data, complicating the device.

SUMMARY OF THE INVENTION

An object of the present invention is to provide a parallel accessible memory device enabling the simultaneous access of an area of "$n_1 \times n_2 \times \ldots \times n_k$" with a single accessing operation without increasing the scale of the device and at low cost.

In order to accomplish the object mentioned in the above, the present invention provides a "k"-dimensional memory device ($k=1, 2, \ldots$) comprising the number of submemories "$n_1 \times n_2 \times \ldots \times n_k$" each having a memory capacity of $1/(n_1 \times n_2 \times \ldots \times n_k)$ of the total memory capacity. Each of the submemories stores data every $n_i$th address of a corresponding dimension, and adjacent submemories store data every other address, so that a region of "$n_1 \times n_2 \times \ldots \times n_k$" of the stored data can be accessed in parallel. The device comprises address converting means for generating addresses of the submemories of the respective dimensions according to respective dimensional addresses, data rearranging means for rearranging, in a required order, input/output data of the respective submemories designated according to the addresses from the address converting means, and a write controlling means for selectively renewing an optional number (one to "$n_1 \times n_2 \times \ldots \times n_k$") of data in a region of "$n_1 \times n_2 \times \ldots \times n_k$".

According to the present invention, there are provided the number of submemories "$n_1 \times n_2 \times \ldots \times n_k$" each having the capacity of $1/(n_1 \times n_2 \times \ldots \times n_k)$ of the total capacity.

The address converting means generates, according to a given "k"-dimensional address, addresses of the submemories corresponding to data of the region "$n_1 \times n_2 \times \ldots \times n_k$" with respect to the given "k"-dimensional address.

Correspondence between the data of the region "$n_1 \times n_2 \times \ldots \times n_k$" and the data lines of the submemories is not constant but changes depending on the given "k"-dimensional address. Therefore, the data rearranging circuit rearranges the data lines of the submemories according to the "k"-dimensional address and output data rearranged in a required order.

In writing operation, the writing control means controls to write required data only.

BRIEF DESCRIPTION OF THE DRAWINGS

These and other objects, features and advantages of the present invention will become apparent from the following description of the preferred embodiments taken in conjunction with the accompanying drawings in which:

FIG. 5 is an explanatory view showing the concept of a parallel accessing in the one-dimensional memory device;

FIG. 6 is an explanatory view showing the relation between one-dimensional addresses and submemory addresses;

DETAILED DESCRIPTION OF THE PREFERRED EMBODIMENTS

FIGS. 1 to 6 show an embodiment of the present invention which realizes a parallel accessing of, for instance, four data stored in four one-dimensional memories. The principle of this embodiment will now be described.

Figure 1:
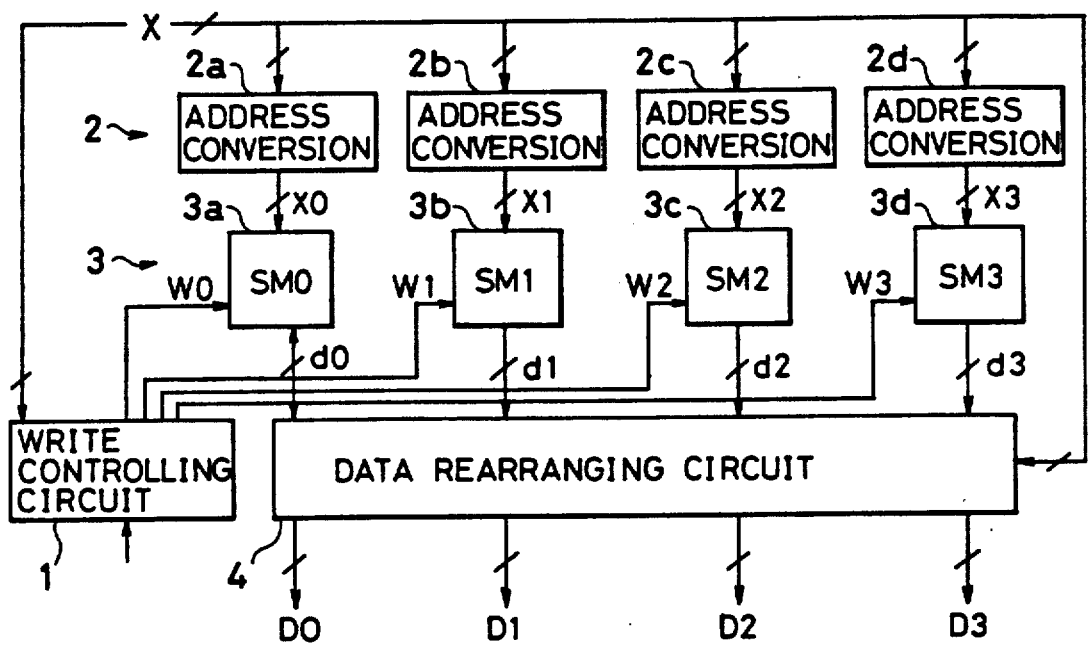
FIG. 1 is a view showing the constitution of a one-dimensional memory device according to the present invention.

As shown in FIG. 1, a one-dimensional memory comprises four submemories SM0, SM1, SM2 and SM3 each having a capacity of one fourth of the total memory capacity. An address of the one-dimensional memory is represented by "X".

As shown in FIG. 5, the submemory SM0 stores data d0 of addresses X (=0, 4, 8, ...), the submemory SM1 storing data d1 of addresses X (=1, 5, 9, ...), the submemory SM2 storing data d2 of addresses X (=2, 6, 10, ...) and the submemory SM3 storing data d3 of addresses X (=3, 7, 11, ...).

When an optional one-dimensional address X (4K, 4K+1, 4K+2, ...; K>0) is supplied, four data of addresses X+0, X+1, X+2 and X+3 simultaneously are read out of the submemories SM0 to SM3 respectively.

The submemories SM0, SM1, SM2 and SM3 store the data d0, d1, d2 and d3 respectively, and these data d0 to d3 are considered as signal lines connected to the submemories SM0 to SM3 respectively when the data are rewritten as described later.

In this case, as shown in FIG. 5, four kinds of arrays will be possible for the data of d0 to d3, i.e., an array in the order of d0, d1, d2 and d3; an array in the order of d1, d2, d3 and d0; an array in the order of d2, d3, d0 and d1; and an array in the order of d3, d0, d1 and d2. The array is determined by a value of "X mod 4" (a remainder of X divided by 4). For every four data, the above-mentioned relationship is repeated. Generally, there are "n" correspondences to be determined by "X mod n" for "n" pieces of data.

Supposing that addresses of the submemories SM0, SM1, SM2 and SM3 are represented by X0, X1, X2 and X3 respectively, the relation between the one dimensional address X and the submemory addresses X0 to X3 is shown in FIG. 6. For instance, with respect to given one-dimensional addresses X of 0, 1, 2 and 3, the addresses X0 to X3 of the submemories are respectively composed of four patterns "0, 0, 0, 0", "1, 0, 0, 0", "1, 1, 0, 0" and "1, 1, 1, 0".

The addresses X0 to X3 of the submemories are represented by the following formulae according to the one-dimensional address X:

$X0 = (X+3)$ div 4
$X1 = (X+2)$ div 4
$X2 = (X+1)$ div 4
$X3 = X$ div 4 where "div" means an integer division.

Generally, the addresses X0, X1, X2, ... $X_{n-1}$ of submemories $SM_0$ to $SM_{n-1}$ are represented by the following formulae:

$X0 = (X+n-1)$ div $n$
$X1 = (X+n-2)$ div $n$
$X_{n-1} = X$ div $n$

The embodiment shown in FIG. 1 realizes the above-mentioned principle. A memory device of the embodiment comprises four submemories 3a, 3b, 3c and 3d each having one fourth of the total memory capacity, address converters 2a, 2b, 2c and 2d provided for the submemories 3a to 3d respectively to generate addresses X0, X1, X2 and X3 of the submemories 3a to 3d respectively according to a one-dimensional address X, and a data rearranging circuit 4 for rearranging, in a proper order, data lines d0, d1, d2 and d3 of the submemories 3a to 3d and outputting element data D0, D1, D2 and D3. The element data D0 is the one for the one-dimensional address X, the element data D1 for a one-dimensional address X+1, the element data D2 for a one-dimensional address X+2 and the element data D3 for a one-dimensional address X+3.

Figure 2:
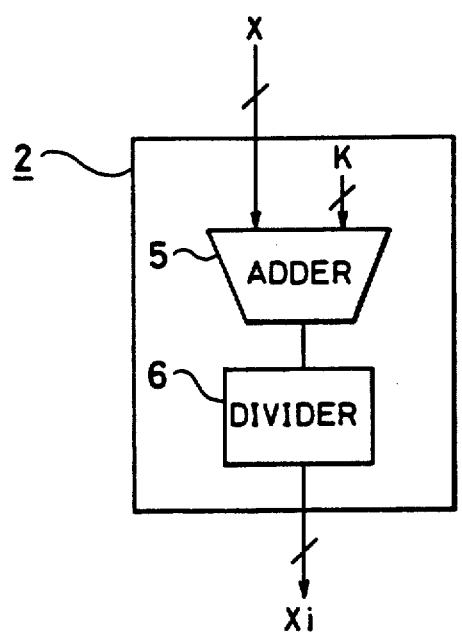
FIG. 2 is a view showing the constitution of an address converter.

FIG. 2 is a view showing the constitution of each address converter 2 mentioned in the above.

The address converter 2 comprises an adder 5 and a divider 6.

One input terminal of the adder 5 receives the one-dimensional address X, and the other input terminal thereof a constant K (=0 to n−1). An added value "X+K" is supplied to the divider 6.

After receiving the value "X+K", the divider 6 calculates the following:

$Xi = (X+K)$ div $n$ $(K=n-1; i=0$ to $n-1)$

If "$n=2^p (p=1, 2, 3, ...)$" is established as in the case of this embodiment, "div n" is equal to a shift by "p" bits to the right. Therefore, the above calculation is solved as a matter of wiring in which lower "p" bits are disregarded to output the remaining bits in the output of the adder 5. Since "n" is 4 in this embodiment, the calculation of "div 4" can be carried out by shifting two bits to the right and disregarding lower two bits and outputting the remaining ones.

For instance, if the one-dimensional address X is 5 (0101 in binary notation), consecutive four values are specified from the address of X=5. In this case, the address X0 of the submemory 3a is obtained as follows:

(5+3) div 4=2 (0010 in binary notation)

Here, an output of the adder 5 is 8 (1000 in binary), and, by shifting lower two bits of this value 8 to the right to disregard the lower two bits, a value of 0010 (binary)=2 (decimal) which is the same as the above-mentioned value can be obtained.

From the respective address converters 2a, 2b, 2c and 2d, the submemory addresses X0, X1, X2 and X3 are supplied to the submemories 3a, 3b, 3c and 3d.

The submemories 3a to 3d output data d0, d1, d2 and d3 of the supplied submemory addresses X0, X1, X2 and X3 respectively, to the data rearranging circuit 4.

The data rearranging circuit 4 receives the data d0 to d3 from the submemories 3a to 3d respectively, and comprises four bidirectional data selectors 7a, 7b, 7c and 7d.

Figure 3:
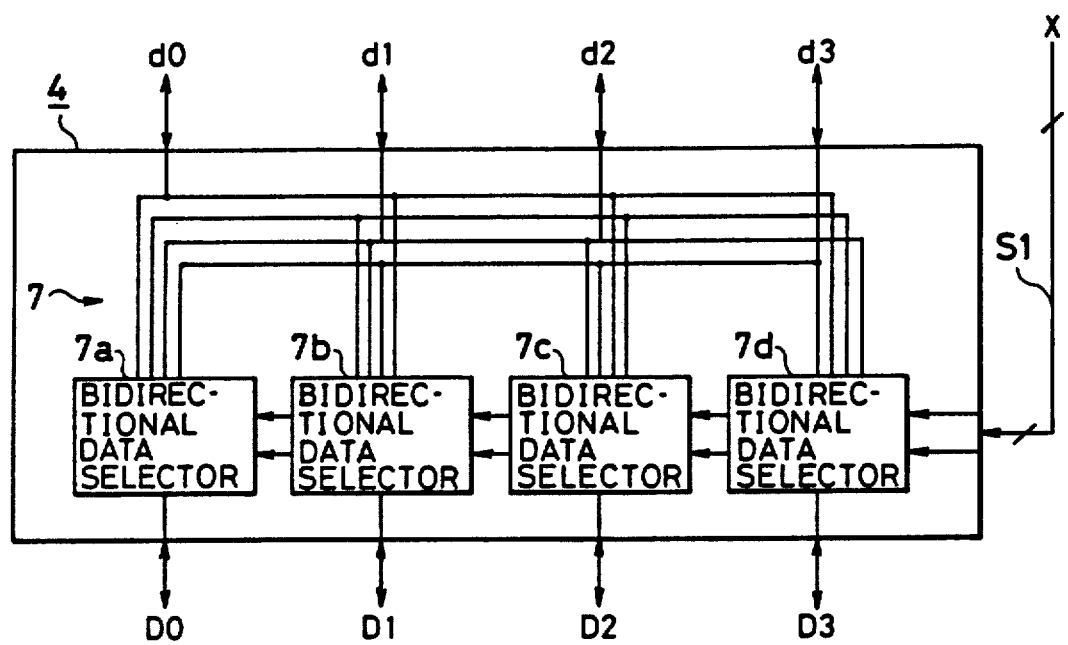
FIG. 3 is a view showing the constitution of a one-dimensional data rearranging circuit.

The bidirectional data selectors 7a to 7d are so connected as to receive the submemory data d0 to d3 respectively. As shown in FIG. 3, a data receiving pattern of the selector 7a is in the order of d0, d1, d2 and d3 from the left of input terminals thereof, the selector 7b in the order of d1, d2, d3 and d0, the selector 7c in the order of d2, d3, d0 and d1 and the selector 7d in the order of d3, d0, d1 and d2.

To the respective selectors 7a to 7d, there are supplied lower two bits of the one-dimensional address X as a selection controlling signal S1.

Figure 4:
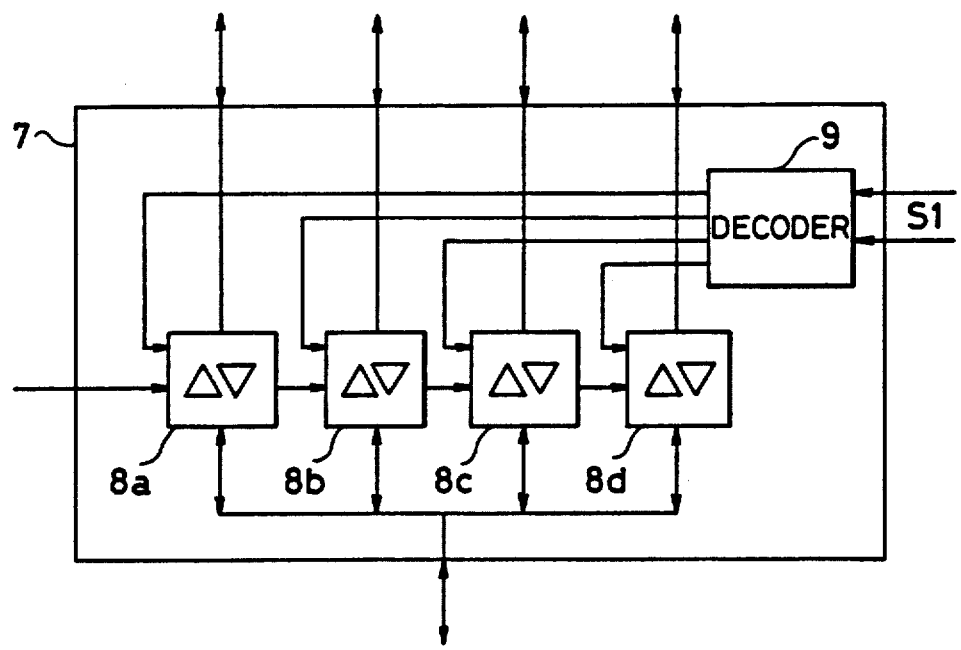
FIG. 4 is a view showing the constitution of a bidirectional data selector.

FIG. 4 is a view showing the constitution of the selector 7. The selector 7 comprises four bidirectional buffers 8a, 8b, 8c and 8d, and a decoder 9 for decoding the above-mentioned selection controlling signal S1 and supplying it as a decoded signal for controlling tri-state inputs of the respective bidirectional buffers 8a to 8d.

To the bidirectional buffers 8a to 8d, there are supplied the data d0 to d3 of the submemories in the above-mentioned patterns respectively.

The selection controlling signal S1 constituted by the lower two bits of the one-dimensional address X and inputted into the tri-state inputs of the respective buffers 8a to 8d is "00" for accessing the submemory 3a, "01" for accessing the submemory 3b, "10" for accessing the submemory 3c and "11" for accessing the submemory 3d.

Therefore, the buffer 8a is activated with the signal S1=00, the buffer 8b with the signal S1=01, the buffer 8c with the signal S1=10 and the buffer 8d with the signal S1=11.

The operation of the embodiment will be described by using a concrete example. Suppose that the data of one-dimensional addresses from X=5 through X+1=6 and X+2=7 to X+3=8 are read out.

The data of the one-dimensional address X=5 is stored in advance in an address of X1=1 of the submemory 3b, the data of the one-dimensional address X=6 in an address X2=1 of the submemory 3c, the data of the one-dimensional address X=7 in an address X3=1 of the submemory 3d and the data of the one-dimensional address X=8 in an address X0=2 of the submemory 3a.

When the one-dimensional address X=5 is supplied to the respective address converters 2a to 2d, outputs of the adders 5 of the respective address converters 2a to 2d are 8 (=1000 in binary notation), 7 (=0111), 6 (=0110) and 5 (0101).

By disregarding the lower two bits of the outputs as described in the above, the addresses of the respective submemories are X0=10, X1=01, X2=01 and X3=01 in binary notation, i.e., X0=2, X1=1, X2=1 and X3=1 in decimal notation.

Thus, the supplied one-dimensional address X=5 is converted into the addresses of the submemories to specify where the four pieces of consecutive data are stored in the one-dimensional address X=5.

The addresses X0 to X3 are supplied to the submemories 3a to 3d. The data d0 to d3 of the respective submemories are outputted to the data rearranging circuit 4.

Since the process is to read the four consecutive data of the addresses starting from the address X=5, i.e., the four data starting from the data d1 of the submemory address X1, the lower two bits "01" of the address X=5 (=0101) are supplied as the selection controlling signal S1 to the respective selectors 7a to 7d.

At this time, in the selectors 7a to 7d, only the buffer 8b is activated while the other buffers 8a, 8c and 8d have high impedance.

As a result, the data d1, d2, d3 and d0 are taken out as element data D0, D1, D2 and D3 respectively.

In this embodiment, only the parallel reading has been explained, and a parallel writing, which will be described later, has been omitted. A write controlling circuit to be described later is applicable for a one-dimensional writing to rewrite optional element data.

In this embodiment, a one-dimensional address X has been used to specify a leftmost data of four pieces of data to take out four pieces of data X+0, X+1, X+2 and X+3. It is also possible to specify other data, for instance, the second data from the left. In this case, addresses of the submemories are calculated as follows:

$$X0 = (X + n - 2) \text{ div } n$$
$$= (X + 2) \text{ div } 4$$
$$X1 = (X + n - 3) \text{ div } n$$
$$= (X + 1) \text{ div } 4$$
$$\ldots$$

Therefore, element data around the address X can be parallel-accessed.

Although the address converter 2 has been constituted as shown in FIG. 2 in this embodiment, it is also possible to provide a memory for storing calculated data to read data corresponding to the address out of the memory, whenever an address X is given.

Further, the bidirectional data selector 7 may be constituted by analog switches of CMOS structure which can receive bidirectional data.

Also, the bidirectional data selector 7 may be constituted by two pairs of unidirectional data selectors, multiplexers and demultiplexers to separate the respective inputs and outputs.

Figure 7:
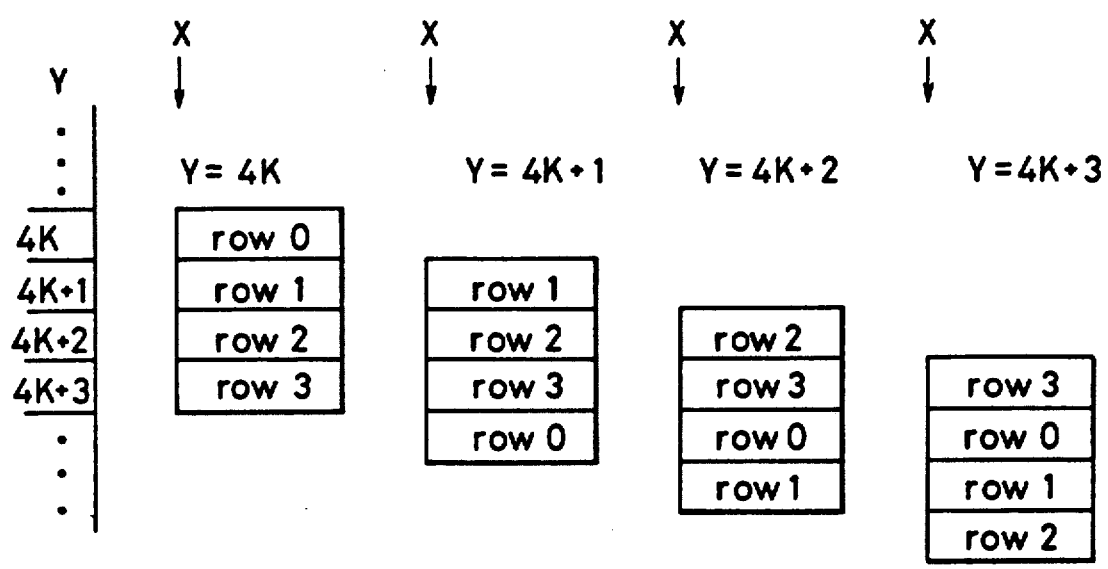
FIG. 7 is an explanatory view showing the concept of a parallel accessing in a two-dimensional memory device.

FIG. 7 is an explanatory view showing the concept of a two-dimensional memory according to the present invention.

The two-dimensional memory can be considered that the one-dimensional memory of the previous embodiment is expanded along direction Y. Therefore, for picking up four rows of data Y+1, Y+2, Y+3 and Y+4 according to address Y, there are four patterns as shown in FIG. 7. In the figure, a reference mark "ROW" represents a row.

Figure 8:
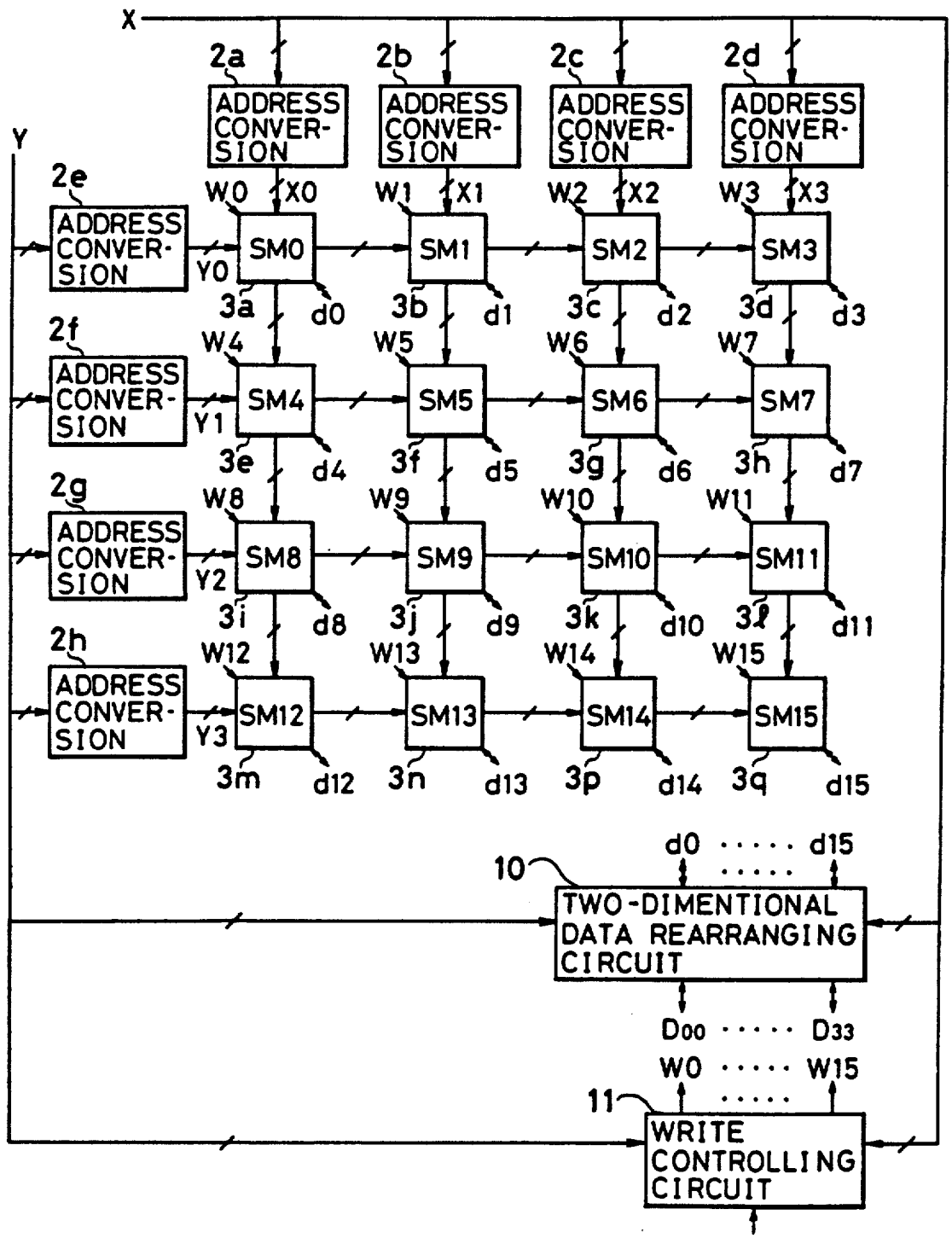
FIG. 8 is a view showing the constitution of a two-dimensional memory device according to the present invention.

FIG. 8 is a view showing the constitution of a two-dimensional memory which can access "n×m" data in parallel.

This memory has 16 (4×4) submemories SM0 to SM15 (3a to 3q) each having one sixteenth capacity of the total memory capacity.

According to this embodiment, there are provided address converters 2e, 2f, 2g and 2h for converting the two-dimensional address Y into submemory addresses Y0, Y1, Y2 and Y3. The constitution of the address converter is the same as that of the address converter shown in FIG. 2.

Figure 9:
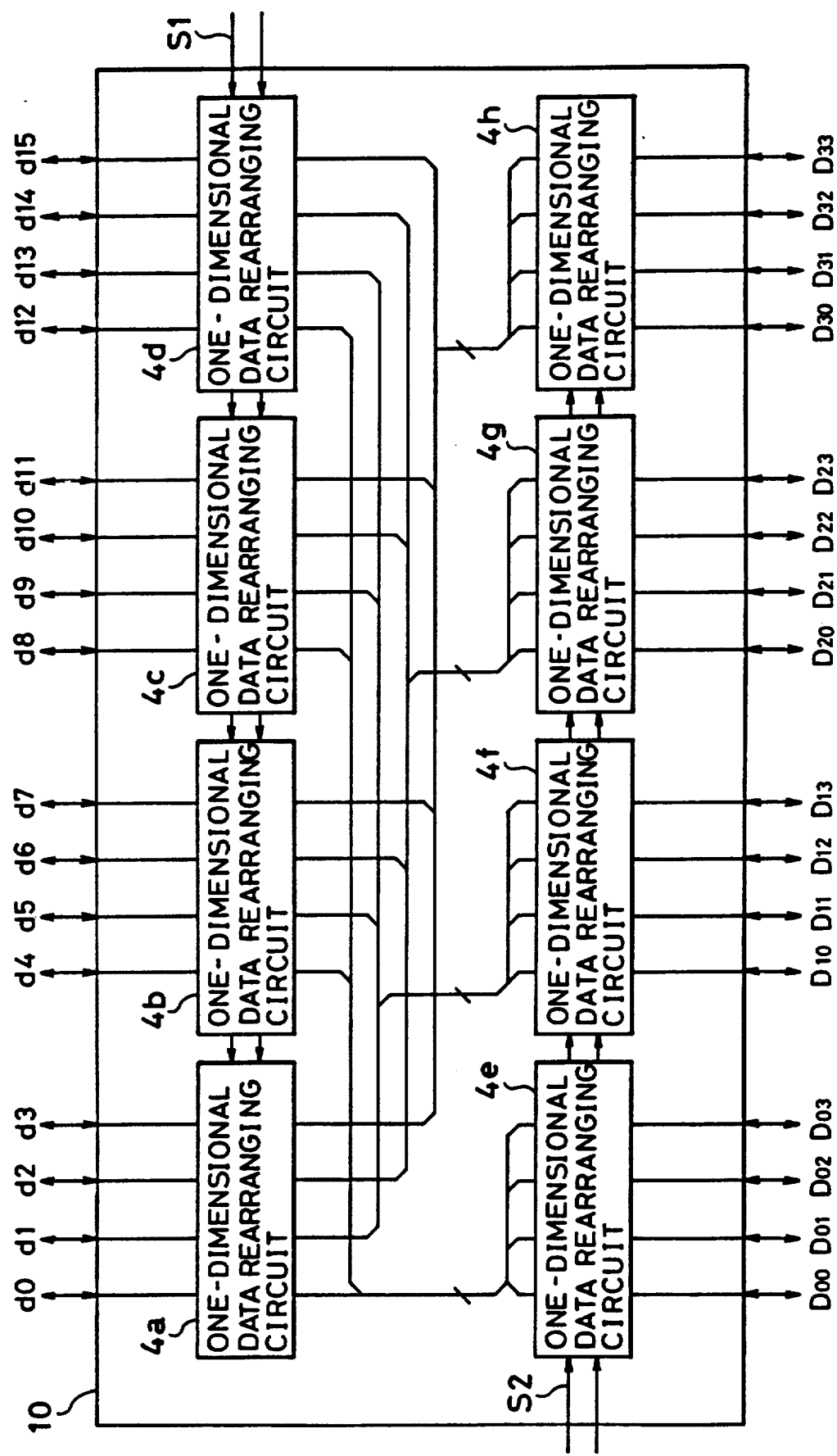
FIG. 9 is a view showing the constitution of the rearranging circuit for rearranging two-dimensional data.

A two-dimensional data rearranging circuit 10 shown in FIG. 9 is disposed to receive output data d0 to d15 of the submemories SM0 to SM15.

The two-dimensional rearranging circuit 10 is constituted by eight one-dimensional data rearranging circuits, four of them being disposed in the direction X and the other four in the direction Y, each being the same as the circuit 4 shown in FIG. 3.

Each of the one-dimensional data rearranging circuits 4 (4a to 4h) receives a selection controlling signal S1 for the direction X and a selection controlling signal S2 for the direction Y. The selection controlling signals S1 and S2 are constituted by the lower two bits of the two-dimensional address X and the lower two bits of the two-dimensional address Y respectively to realize 16 arrangement patterns determined by values of "X mod 4" and "Y mod 4".

The two-dimensional memory device further comprises a write controlling circuit 11 for controlling a writing operation.

Generally in a spatial filtering operation in image processing, it is frequent that data stored in a two-dimensional region of "n×m" are read to rewrite only one pixel among the data. In this case, the prior art technique is constituted to read the data in the region of "n×m", stores them in buffer memories temporarily, rewrite one pixel among the data, and write the data of the buffer memories into the region so that the prior art may require each one accessing time for the reading and for the writing.

The write controlling circuit 11 of this embodiment controls writing signals to be supplied to the respective submemories such that only optional element data specified among 16 element data are written into the submemories. At this time, element data Di which are not specified are disregarded. In the writing operation, the data d0, d1, d2 and d3 are considered as signal lines of the submemories SM0, SM1, SM2 and SM3 respectively.

Figure 10:
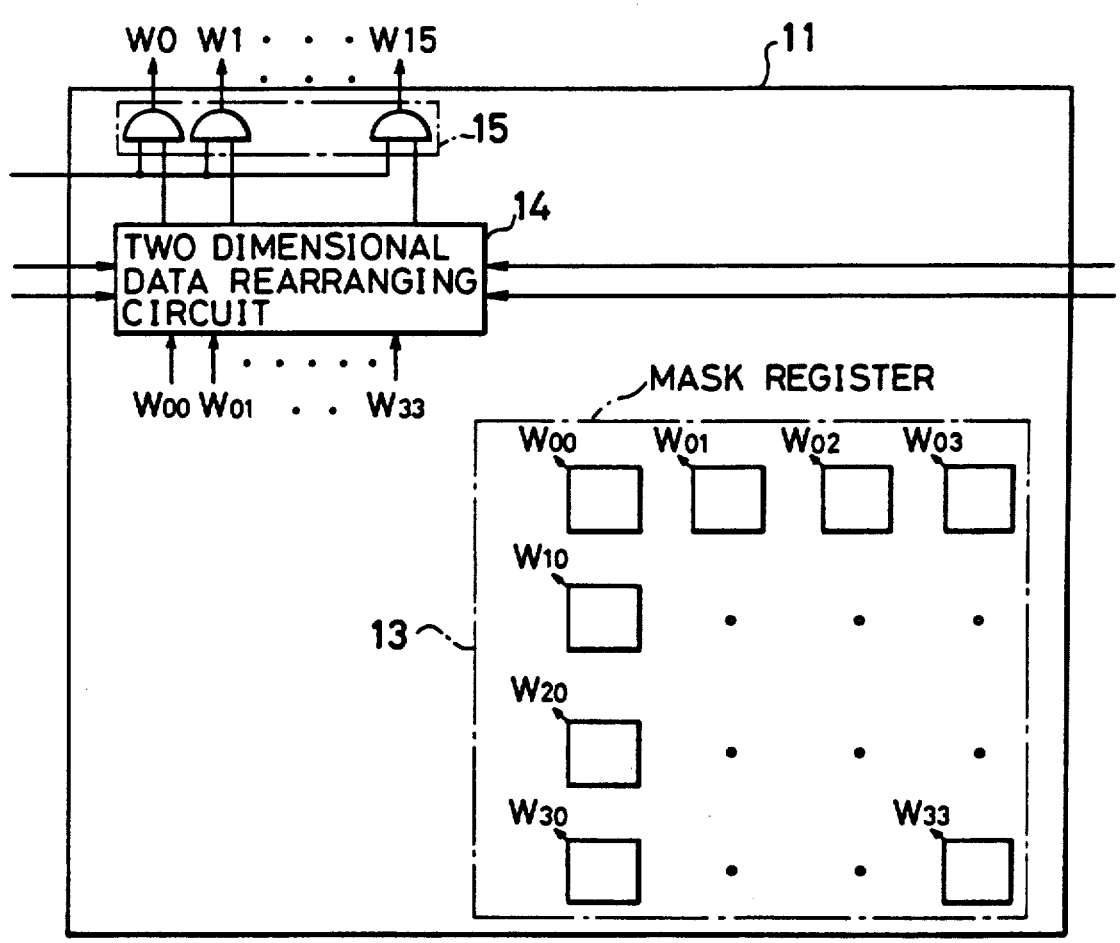
FIG. 10 is a view showing the constitution of a write controlling circuit.

FIG. 10 is a view showing the constitution of the write controlling circuit 11.

The write controlling circuit 11 comprises 16 pieces (n=m=4; n×m=16) of write masking registers 13, a two-dimensional data rearranging circuit 14 for one-bit data and an AND circuit 15.

Each masking register 13 corresponds to an element data Dij, and only element data corresponding to masking registers having a value "1" among the masking registers 13 are written.

As described before, correspondence between the element data and the submemories will be changed according to values "X mod n" and "Y mod m" (n=m=4). Therefore, the rearranging circuits 14 mask the element data and correspond write controlling signals to the submemories.

The two-dimensional data rearranging circuit 14 receives the lower two bits of an address X and the lower two bits of an address Y as selection controlling signals in the directions X and Y respectively to rearrange the write controlling signals. Logical products of outputs of the rearranging circuit 14 and writing signals are calculated in the AND circuit 15, and outputs of the AND circuit 15 are supplied as write signals W0, W1, ... W15 to the respective submemories. This constitution is also used in the write controlling circuit 1 shown in FIG. 1 where the write controlling circuit 1 outputs four writing signals W0, W1, W2 and W3 to the submemories SM0, SM1, SM2 and SM3.

In this way, only required submemories are written with data.

As described in the above, the present invention uses "$n_1 \times n_2 \times \ldots \times n_k$" submemories each having a capacity of $1/(n_1 \times n_2 \times \ldots n_k)$ of the total memory to rearrange data of the respective submemories so that an optional region of "$n_1 \times n_2 \times \ldots \times n_k$" can be parallel-accessed by a single accessing operation without increasing the memory capacity and the accessing time.

In addition, in writing operation, a specified optional number (one to "$n_1 \times n_2 \times \ldots \times n_k$") of elements among the region of "$n_1 \times n_2 \times \ldots \times n_k$" can be rewritten by a single accessing operation.

What is claimed is:

1. A parallel accessible M-dimensional memory device, comprising:

$N_i$ column submemories for i-th dimension (i=1, ..., M) where $N_i$ is a positive integer, each one of the $N_i$ column submemories having $1/N_i \times N_2 \times \ldots \times N_n$ capacity of a total memory capacity of the device, each one of the $N_i$ column submemories having addresses addressed by an integer submemory address $S_j=0, 1, 2, \ldots$ (j=0, 1, ..., $N_i-1$) labeling rows within each column submemory, the addresses of the $N_i$ column submemories being also addressed by an M-dimensional integer input address $X_i=0, 1, 2, \ldots$ (i=1, ..., M) labeling the addresses of all of the $N_i$ column submemories collectively, and where (j+1)-th one of the $N_i$ column submemories stores (j+1+nN$_i$)-th data for i-th dimension, (n=0, 1, ...):

address converting means for obtaining $N_i$ submemory addresses $S_j$ for $N_i$ data to be parallel accessed, for the M-dimensional input addresses $X_i$ supplied externally; and data rearranging means for rearranging the $N_i$ data read out from the $N_i$ submemory addresses $S_j$ of the $N_i$ submemories obtained by the address converting means, in accordance with the M-dimensional input address $X_i$, such that the $N_i$ data are arranged in an order labeled by the M-dimensional input address $X_i$.

2. The device of claim 1, wherein the address converting means obtains the $N_i$ submemory addresses $S_j$ from the M-dimensional input address $X_i$ according to a formula:

$$S_j = (X_i + N_i - 1 - j) \text{ div } N_i$$

3. The device of claim 2, wherein the address converting means further comprises:

adder means for calculating $A = (X_i + N_i - 1 - j)$; and divider means for calculating $A/N_i$ in accordance with the A calculated by the adder means.

4. The device of claim 3, wherein $N_i = 2^p$ where p is a positive integer, and wherein the divider means receives the A in binary expression and calculates the $A/N_i$ as a number obtained by removing p least significant bits from the A.

5. The device of claim 1, wherein the data rearranging means includes $N_i$ bidirectional data selector means, provided in correspondence with the $N_i$ column submemories, for rearranging the $N_i$ data, where (j−1)-th one of the $N_i$ bidirectional data selector means receives all of the $N_i$ data, obtains a series of the $N_i$ data in which the $N_i$ data are arranged in an order labeled by the M-dimensional input address $X_i$ and then cyclically permutated such that the series starts from the (j+1)-th one of the $N_i$ data, and output one of the $N_i$ data selected in accordance with the M-dimensional input address $X_i$.

6. The device of claim 5, wherein $N_i = 2^p$ where p is a positive integer, and wherein the (j+1)-th one of the $N_i$ bidirectional data selector means selects one of the $N_1$ data to be outputted by selecting q-th data in the series of the $N_i$ data, where q is a number specified by p least significant bits of the M-dimensional input address $X_i$.

7. The device of claim 1, further comprising write controlling means for selectively allowing a part of the $N_1$ data to be overwritten by new data, by providing a write control signal to each one of the $N_i$ column submemories, the write control signal indicating whether one of the $N_i$ data read out from each one of the $N_i$ column submemories belongs to the part to be overwritten.

8. The device of claim 7, wherein the write controlling means further comprises:

masking register means for providing indication for the part of the $N_i$ data to be overwritten in an arrangement of the $N_i$ data obtained by the data rearranging means;

additional data rearranging means for rearranging the indication from the masking register means from the arrangement of the $N_i$ data obtaining by the data rearranging means into an arrangement of the $N_i$ data stored in the $N_i$ column submemories; and AND gate means for producing the write control signal by taking logical AND product of the indication from the masking register means as rearranged by the additional data rearranging means and an externally supplied write command.

* * * * *